US 8,484,719 B2

(12) United States Patent
Nakatomi

(10) Patent No.: US 8,484,719 B2
(45) Date of Patent: Jul. 9, 2013

(54) INFORMATION PROCESSING APPARATUS, INFORMATION PROCESSING METHOD, AND MEDIA STORING A PROGRAM THEREFOR

(75) Inventor: Masashi Nakatomi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1076 days.

(21) Appl. No.: 12/028,602

(22) Filed: Feb. 8, 2008

(65) Prior Publication Data

US 2008/0229407 A1 Sep. 18, 2008

(30) Foreign Application Priority Data

Mar. 16, 2007 (JP) ................................. 2007-068857

(51) Int. Cl.
*H04L 29/06* (2006.01)

(52) U.S. Cl.
USPC .......................................................... 726/17

(58) Field of Classification Search
USPC ...................................................... 726/17, 2
See application file for complete search history.

(56) References Cited

U.S. PATENT DOCUMENTS

| | | | | |
|---|---|---|---|---|
| 6,912,692 B1 * | 6/2005 | Pappas | ........................... | 715/762 |
| 7,191,407 B1 * | 3/2007 | Kluttz et al. | ................... | 715/788 |
| 2003/0011811 A1 * | 1/2003 | Clough | ......................... | 358/1.15 |
| 2003/0105738 A1 * | 6/2003 | Taketa et al. | ...................... | 707/1 |
| 2003/0217201 A1 * | 11/2003 | Gargi et al. | ...................... | 710/16 |
| 2004/0268229 A1 * | 12/2004 | Paoli et al. | ...................... | 715/508 |
| 2005/0141014 A1 * | 6/2005 | Kikuchi et al. | ............... | 358/1.14 |
| 2006/0129539 A1 * | 6/2006 | Nakatomi | .......................... | 707/3 |
| 2006/0187479 A1 * | 8/2006 | Kikuchi | ........................ | 358/1.13 |
| 2006/0245006 A1 | 11/2006 | Nakata et al. | | |
| 2007/0109577 A1 * | 5/2007 | Yoshida | ........................ | 358/1.13 |
| 2007/0136288 A1 | 6/2007 | Shimada et al. | | |
| 2007/0226637 A1 * | 9/2007 | Yaseen et al. | .................. | 715/762 |
| 2007/0282658 A1 * | 12/2007 | Brintle | ............................... | 705/9 |

FOREIGN PATENT DOCUMENTS

| | | |
|---|---|---|
| JP | 2004-72563 | 3/2004 |
| JP | 2006-229556 | 8/2006 |
| JP | 2006-0309673 | 11/2006 |
| JP | 2007-48240 | 2/2007 |
| JP | 2007-141190 | 6/2007 |

OTHER PUBLICATIONS

May 17, 2011 Japanese official action in connection with a counterpart Japanese patent application.

* cited by examiner

*Primary Examiner* — David Pearson
(74) *Attorney, Agent, or Firm* — Cooper & Dunham LLP

(57) ABSTRACT

A disclosed information processing apparatus makes it possible for a user to perform a desired operation easily by displaying operation candidates based on an operation history. The apparatus comprises a storage unit in which an operation history table is stored, the table associating tasks with operations. A user who performs an operation is authenticated by a user authentication unit. Task information concerning the authenticated user is acquired by a task acquisition unit. Based on the acquired task information, an operation candidate presenting unit presents operation candidates by referring to the operation history table. The operation history table is updated by a history management unit in accordance with an operation designated by the user.

13 Claims, 20 Drawing Sheets

FIG.3

| TASK ID | DATE/TIME | USERS | LOCATION | TASK |
|---|---|---|---|---|
| 00001 | 2006/04/10 10:00 | A,B,C,D | MEETING ROOM A | PROJECT MEETING |
| 00002 | 2006/04/10 15:00 | B,C,E | HALL B | SOLUTION FAIR |
| 00003 | 2006/04/11 11:00 | A,B,C | MEETING ROOM B | PROJECT A DEBRIEF SESSION |
| 00004 | 2006/04/12 13:00 | A,B,C,D | MEETING ROOM A | PROJECT MEETING |
| ... | ... | ... | ... | ... |

FIG.4

| USER ID | USER NAME |
|---------|-----------|
| 00001 | TARO RICOH |
| 00002 | HANAKO RICOH |
| ... | ... |

FIG.5

| OPERATION CONTENT | DATE/TIME | USER ID | TASK ID |
|---|---|---|---|
| TWO COPIES: BOTH SIDES | 2005/10/09 10:10 | 00004 | 00001 |
| MAIL TX: abc@ricoh.co.jp | 2005/10/09 17:10 | 00246 | 00004 |
| FAX TX: 03-XXXX-XXXX | 2005/10/10 09:21 | 00012 | 00001 |
| SCAN AND SAVE AS "DISTRIBUTED MATERIAL" | 2005/10/10 09:31 | 00455 | 00003 |
| ... | ... | ... | ... |

FIG.11

| TYPE OF TASK | ITEMS | | | |
|---|---|---|---|---|
| SCHEDULE | SCHEDULED EVENT | TASK ID | DATE/TIME | USERS | LOCATION |
| TO-DO | TO-DO ACTIVITY | TASK ID | DATE/TIME | USERS | LOCATION |
| PROJECT | CONTENT OF PROJECT | TASK ID | DATE/TIME | USERS | LOCATION |
| USER GROUP | GROUP NAME | TASK ID | DATE/TIME | USERS | LOCATION |

FIG.12

DESIGNATE A SCHEDULED ACTIVITY

| | | NAME | USERS | LOCATION |
|---|---|---|---|---|
| | △ PREVIOUS | | | |
| SELECT | 2005/02/02 13:00-15:00 | PROJECT MEETING | (A,B,C,D) | MEETING ROOM A |
| SELECT | 2005/02/03 9:00-17:00 | SOLUTION FAIR | (B,C,E) | HALL B |
| SELECT | 2005/02/04 10:00-12:00 | PROJECT A DEBRIEF SESSION | (A,B,C,) | MEETING ROOM B |
| SELECT | 2005/02/04 3:00 | VISIT COMPANY A | (E,F) | ADDRESS(e.g. CITY/STREET/BLOCK#) |
| SELECT | 2005/02/05 13:00-15:00 | VISIT COMPANY B | (C,E) | ADDRESS(e.g. CITY/STREET/BLOCK#) |
| | ▽ NEXT | | | |

FIG.13

DESIGNATE A TO-DO ACTIVITY

△ PREVIOUS

| | | NAME | USERS | LOCATION |
|---|---|---|---|---|
| SELECT | 2005/02/02 15:00 | SUBMIT PROJECT REPORT | (A,B) | TOKYO HEAD OFFICE |
| SELECT | 2005/02/02 17:00 | PREPARE SOLUTIONFAIR PROPOSAL | (E) | |
| SELECT | 2005/02/03 14:00~17:00 | PREPARE MATERIAL FOR PROJECT A | (A,C) | |
| SELECT | 2005/02/04 12:00 | PREPARE MATERIAL FOR VISIT TO COMPANY A | | |
| SELECT | 2005/02/05 12:00 | PREPARE MATERIAL FOR VISIT TO COMPANY B | (E) | |

▽ NEXT

FIG.14

DESIGNATE A PROJECT

△ PREVIOUS

| | | NAME | USERS | LOCATION |
|---|---|---|---|---|
| SELECT | 2005/02/02~2005/03/31 | PROJECT A | (A,B) | |
| SELECT | 2005/02/04~2005/02/14 | SOLUTION FAIR | (E) | |
| SELECT | 2005/02/04~2005/03/08 | PROJECT B | (A,C) | |
| SELECT | 2005/02/05~2005/02/10 | SOLUTION FOR COMPANY A | | BRANCHES A AND B |
| SELECT | 2005/02/07~2005/03/02 | NEXT SERVICE PLANNING | (E) | |

▽ NEXT

FIG.15

DESIGNATE A USER GROUP

△ PREVIOUS

| | | NAME | USERS | LOCATION |
|---|---|---|---|---|
| SELECT | 2005/02/02~2005/03/31 | GROUP A | (A,B,C,D) | |
| SELECT | 2005/02/04~2005/02/14 | GROUP B | (B,C,E) | BRANCH C |
| SELECT | 2005/02/04~2005/03/08 | GROUP C | (A,B,C) | |
| SELECT | 2005/02/05~2005/02/10 | GROUP D | (B,E,F) | |
| SELECT | 2005/02/07~2005/03/02 | GROUP E | (B,C,E) | |

▽ NEXT

FIG.16

DESIGNATE A TASK

| | | TYPE | NAME | USERS | LOCATION |
|---|---|---|---|---|---|
| | △ PREVIOUS | | | | |
| SELECT | 2005/02/02~2005/03/31 | USER GROUP | GROUP A | (A,B,C,D) | |
| SELECT | 2005/02/02~2005/03/31 | PROJECT | PROJECT A | (A,B) | |
| SELECT | 2005/02/02 13:00-15:00 | SCHEDULE | PROJECT MEETING | (A,B,C,D) | MEETING ROOM A |
| SELECT | 2005/02/02 15:00 | TO-DO | SUBMIT PROJECT REPORT | (A,B) | TOKYO BRANCH |
| SELECT | 2005/02/03 9:00-17:00 | SCHEDULE | SOLUTION FAIR | (B,C,E) | HALL B |
| | ▽ NEXT | | | | |

FIG.18

- DESIGNATE AN OPERATION
- COPY: BOTH SIDES, 2 COPIES
- MAIL TX: XXX@ricoh.co.jp
- COPY: ONE SIDE, 10 COPIES
- COPY: BOTH SIDES, LAYOUT CHANGE
- FAX TX: 03-XXX-XXXX
- OTHER OPERATIONS

INFORMATION PROCESSING APPARATUS, INFORMATION PROCESSING METHOD, AND MEDIA STORING A PROGRAM THEREFOR

BACKGROUND

1. Technical Field of the Invention

This disclosure relates to information processing apparatus, information processing methods, and recording media storing a program therefor whereby operation candidates are presented based on an operation history when an operation is performed on an electronic file.

2. Description of the Related Art

In an apparatus referred to as a "multifunction peripheral," a printer function, a scan function, a network function, and so on, are combined. In such a multifunction peripheral, image information obtained by scanning a document can be saved in a hard disk in the form of a file. The saved image information (to be referred to as an "image file") can be later searched and a retrieved image file can be printed out or attached to electronic mail for transmission, for example.

However, the number of functions available on a multifunction peripheral has greatly increased, accompanied by an associated increase in the types of operations for performing those functions. As a result, users are faced with greater complexities in selecting various operations, due to an increase in the number of times buttons or the likes need to be pushed before a desired operation can be performed.

In order to solve the above problem, methods have been proposed whereby operations associated with functions with higher frequencies of use are presented, or an operation that has been performed just previously is presented. For example, Japanese Laid-Open Patent Application No. 2004-072563 discloses a method whereby operations are predicted and displayed on an image forming apparatus.

In this method, an operation is predicted and presented based on information about the frequency of use of operations associated with certain functions, or on user information indicating the type of user, such as an administrator. Thus, in such a conventional method, operations having higher frequencies of use by a user are presented, or a screen for selecting an operation customized for each type of user, such as an administrator or general users, is presented. By these methods, the burden accompanying an operation selection process can be reduced.

However, the above methods are disadvantages in the following respects. For example, in the case of the method based on the frequency of use of functions, the burden does not change for the selection of functions with less frequencies of use; indeed, the burden will more likely increase. Since users are likely to be less accustomed to operations associated with functions with less frequencies of use, these are actually the operations for which the burden on the user in connection with operation selection should rather be reduced. Not being able to support the users in this respect has remained a problem.

On the other hand, in the case of the method based on user types, it is necessary to prepare rules associating users with functions. Once associations between types of users and functions are set up as rules, it becomes necessary, if one or more of the associations have been changed over time, to examine the associations and update the rules, which may not be easy. Thus, the method is not suitable for situations where the functions used by certain types of users vary depending on circumstances.

BRIEF SUMMARY

In an aspect of this disclosure, there is provided an information processing apparatus, an information processing method, and a recording medium storing a program therefor whereby a user can perform a desired operation easily without requiring any complex operations.

In another aspect, there is provided an information processing apparatus comprising a storage unit configured to store an operation history table associating a task with an operation; a user authentication unit configured to identify a user who carries out an operation; a task acquisition unit configured to acquire task information concerning the user identified by the user authentication unit; an operation candidate presenting unit configured to present an operation candidate based on the task information acquired by the task acquisition unit and by referring to the operation history table; and a history management unit configured to update the operation history table in accordance with an operation designated by the user.

Preferably, the task is categorized as a scheduled event, to-do information, a project, or a user group.

Preferably, the operation history table associates the task information with date/time information indicating when the operation was carried out. The operation candidate presenting unit may be configured to present operation candidates in chronological order from the current date/time based on the date/time information in the operation history table.

Preferably, the operation history table associates the task information with information about the user who performed the operation. The operation candidate presenting unit may be configured to present operation candidates based on correspondence between the user information in the operation history table and the user identified by the user authentication unit.

Preferably, the operation history table associates the task information with information about the user who performed the operation. The operation candidate presenting unit may be configured to present operation candidates regardless of whether or not the user information in the operation history table corresponds to the user identified by the user authentication unit.

The aforementioned information processing apparatus enables a user to perform a desired operation easily without requiring any complex operations. In an exemplary embodiment, tasks may be managed by groupware, and information regarding to which task a particular operation on an image file belongs is included in an operation history. As a result, operation candidates can be presented based on a task associated with a user, thereby facilitating the user in performing a desired operation.

Other aspects, features, and advantages will become apparent from the following description when taken in conjunction with the accompanying drawings.

BRIEF DESCRIPTION OF THE DRAWINGS

FIG. 3 shows an example of a task list table;

FIG. 4 shows an example of a user list table;

FIG. 5 shows an example of an operation history table;

FIG. 11 shows information items associated with various types of task;

FIG. 12 shows an example of a screen for displaying task information when the type of task is "Schedule";

FIG. 13 shows an example of a screen for displaying task information when the type of task is "To-do";

FIG. 14 shows an example of a screen for displaying task information when the type of task is "Project";

FIG. 15 shows an example of a screen for displaying task information when the type of task is "User group";

FIG. 16 shows an example of a screen for displaying task information regardless of the type of task;

FIG. 18 shows an example of a screen for displaying operation candidates;

DETAILED DESCRIPTION OF THE PREFERRED EMBODIMENTS

In the following, an information processing system according to an embodiment of the present invention is described with reference to the drawings. The present embodiment may involve a machine combining various functions including those of a scanner, a facsimile machine, a copier, and a storage unit (to be hereafter referred to as a multifunction peripheral) in which, when performing an operation on an image, task information is selected to facilitate the retrieval of operations associated with the selected task information. In a typical example, before a user performs a certain process on an image in the multifunction peripheral, the user selects task information, upon which a list of operation candidates associated with the task information is presented. The user can then select a target operation from the operation candidates.

Figure 1:
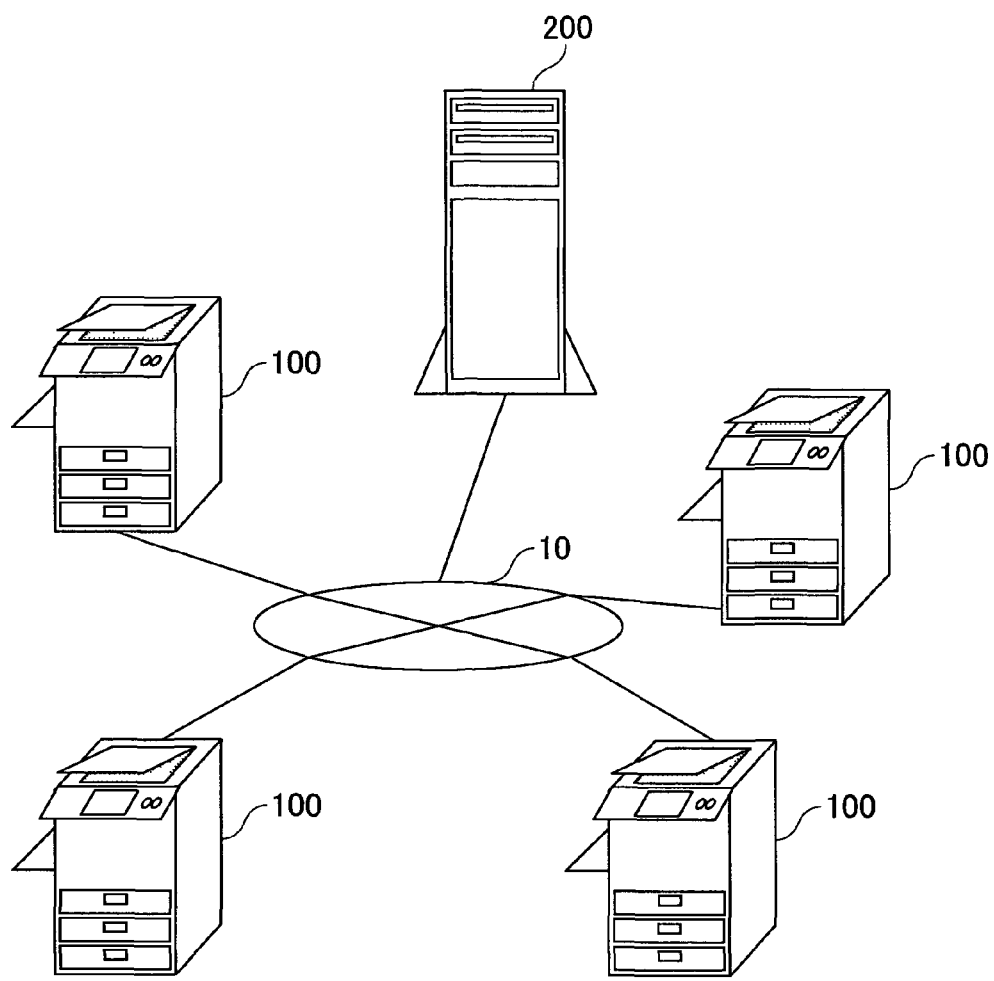
FIG. 1 shows an information processing system according to an embodiment of the present invention.

FIG. 1 shows a configuration of the information processing system according to the present embodiment. The system comprises multifunction peripherals 100 and a task information management server 200, each connected to a network 10. In the information processing system of the present embodiment, task information is managed by the task information management server 200 connected to the network 10. Task information may also be managed by the multifunction peripherals 100.

Figure 2:
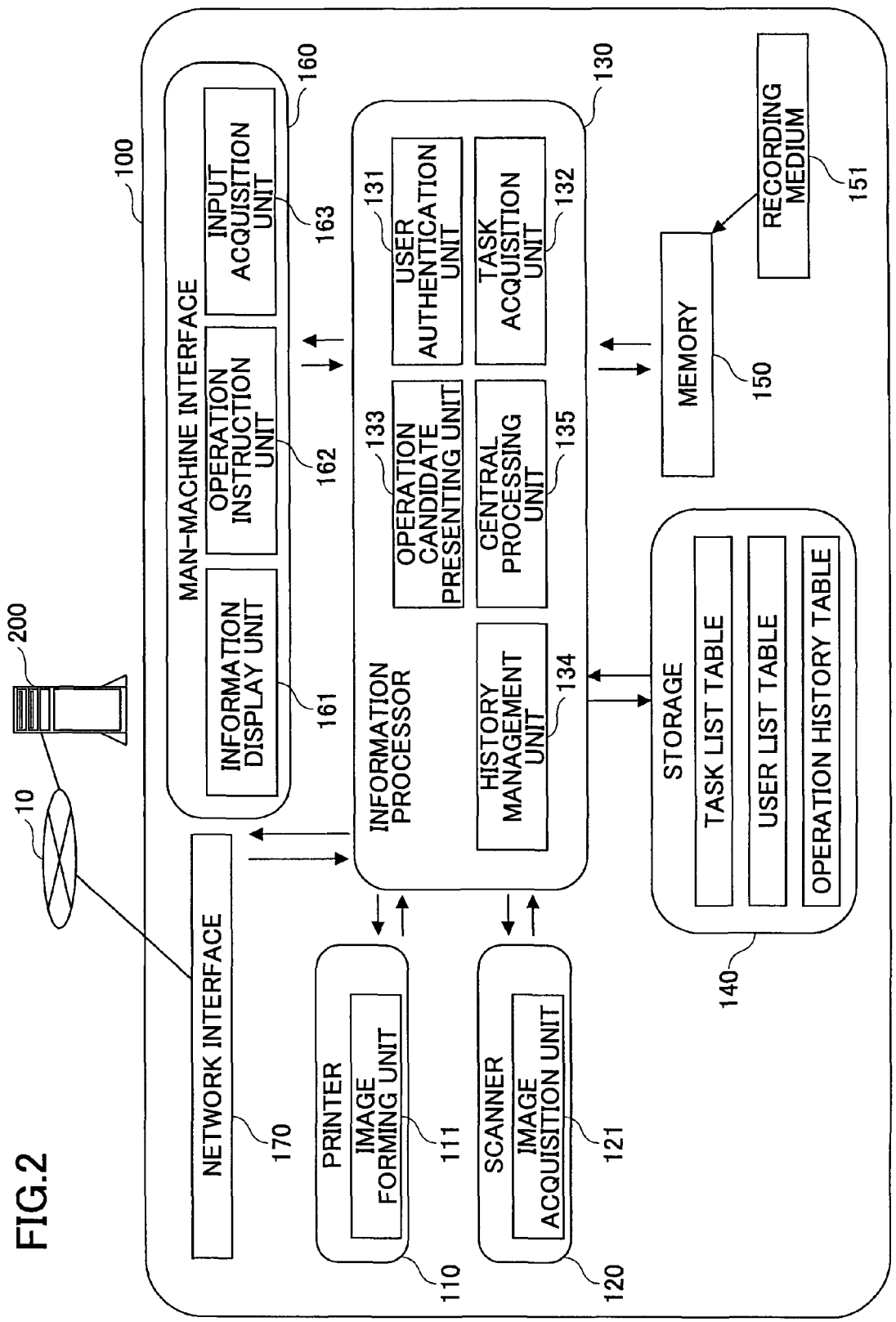
FIG. 2 shows a block diagram of a multifunction peripheral in the information processing system shown in FIG. 1.

FIG. 2 shows a block diagram of the multifunction peripheral 100. The multifunction peripheral 100 comprises a printer device 110; a scanner device 120; an information processing apparatus 130; a storage unit 140; a memory 150; a man-machine interface 160; and a network interface 170.

The printer device 110 comprises an image forming unit 111 configured to form an image based on data provided by the information processing apparatus 130. The formed image can be printed on a paper medium.

The scanner device 120 comprises an image acquisition unit 121 configured to acquire an image file by scanning a recording medium, such as a sheet of paper. The image file can be output to the information processing apparatus 130.

The information processing apparatus 130 comprises a user authentication unit 131 configured to authenticate a user; a task acquisition unit 132 configured to acquire task information concerning a user from the task information management server 200 via the network interface 170; an operation candidate presenting unit 133 configured to present operation candidates based on task information that has been acquired; a history management unit 134 configured to save an operation that has been executed, together with associated task information, in the storage unit 140; and a central processing unit 135. The information processing apparatus 130 may be comprised of a CPU, for example. The individual units of the information processing apparatus 130 may be provided by program modules executed by the CPU.

The storage unit 140 is configured to store images acquired by the image acquisition unit 121; task information associated with users; information about operation histories; and associations between each item of task information and each operation. The memory 150 may comprise a RAM in which information for executing a program is temporarily stored. The memory 150 may be configured to load a program recorded in a recording medium 151 for carrying out a method of the invention.

The man-machine interface 160 comprises an information display unit 161 configured to display information, such as an image file, to a user; an operation instructing unit 162 comprising buttons, a touch panel, etc., for a user to enter instructions into the multifunction peripheral 100; and an input acquisition unit 163 configured to acquire information entered by a user via the operation instructing unit 162.

The network interface 170 is configured to transmit or receive information to or from the devices connected to the network 10.

A "task" herein refers to a user's job or some work. In the present embodiment, a task is categorized as a user group, a scheduled event, to-do information such as a to-do activity, or a project. Additional information about a task, such as an associated location, equipment, users, and date/time is referred to as task-related information. A task and task-related information may be together referred to as task information.

For example, when a task is categorized as a user group, relevant task-related information may consist of information about a location where the user group belongs; equipment that belongs to the user group; people that make up the user group; and a period in which the user group is active.

When a task is categorized as a scheduled event, relevant task-related information may consist of information about a location where the scheduled event takes place; equipment used for the scheduled event; people performing the scheduled event; and date/time of the scheduled event.

When a task is categorized as a to-do list, relevant task-related information may consist of information about a location where the to-do activity takes place; equipment used for the to-do activity; people performing the to-do activity; and a period in which the to-do activity occurs.

When a task is categorized as a project, relevant task-related information may consist of information about a location where the project takes place; people participating in the project; equipment used for the project; and a period in which the project occurs.

The storage unit 140 stores a task list table, an operation history table, and a user list table, for example.

FIG. 3 shows an example of the task list table. The task list table, which shows a list of task information, stores an item of task information in each line. In the first column of the task list table shown in FIG. 3, task IDs uniquely associated with each item of task information are stored.

In the second column, date/time information related to each task is stored. The date/time information includes, e.g., the date and time when a scheduled event or project takes place. The date/time information may indicate either a point in time or a period.

In the third column, information about users concerned with each task is stored. This user information may include user IDs of people taking part in each scheduled event or project. In the fourth column, information about a location associated with each task is stored. Such location information may include the designation of a place where each scheduled event or project takes place.

In the fifth column, information about the content of each task is stored. Such task-content information may include the names of participating members, the name of a user group, the name of a scheduled event, and the name of an activity to be performed.

FIG. 4 shows an example of the user list table. The user list table associates user IDs with user names. In the first column, user IDs uniquely associated with each user are registered. In the second column, user names are registered.

FIG. 5 shows an example of the operation history table. The operation history table stores information about a history of operation in the multifunction peripheral 100. In the first column, the content of each operation is stored. The operation content includes a function and settings for its implementation.

In the second column, information about the date/time when each operation took place is stored. In the third column, user IDs of users who performed each operation are stored. These user IDs correspond to the user IDs in the first column of the user list table of FIG. 4.

In the fourth column, task IDs of tasks associated with each operation are stored. These task IDs correspond to the task IDs in the first column of the task list table shown in FIG. 3.

Figure 6:
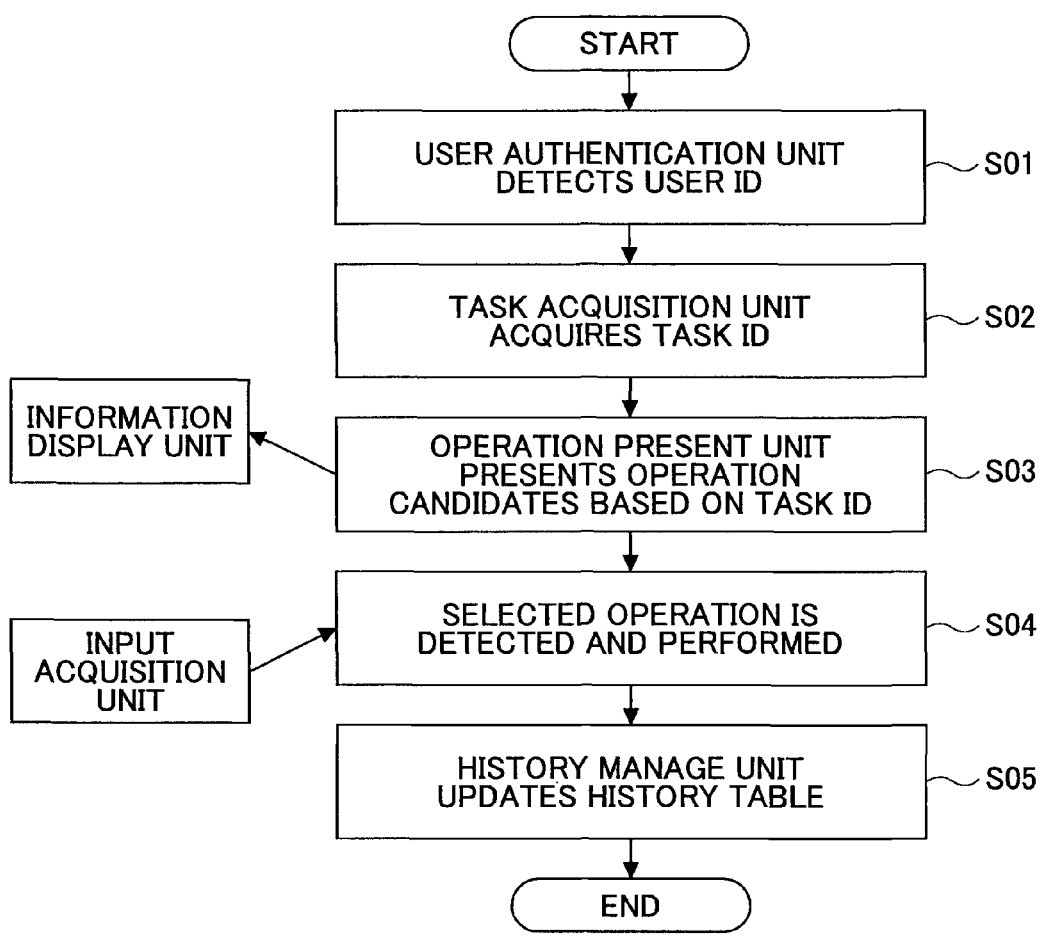
FIG. 6 shows a flowchart of processes performed by the multifunction peripheral.

The flow of processes in the thus configured multifunction peripheral 100 is described with reference to the drawings. FIG. 6 shows a flowchart of processes performed in the multifunction peripheral 100.

First, a user is authenticated by the user authentication unit 131 based on information such as a log-in name or a password that is entered by the user, and a user ID is detected with reference to the user list table registered in advance, for example (step S01).

Then, the task acquisition unit 132 presents task information associated with the user ID on the information display unit 161. Upon designation of a specific item from among the presented task information by the user, the task ID of the designated task is acquired (step S02). The operation candidate presenting unit 133 then refers to the operation history table to obtain operation candidates based on the task ID acquired by the task acquisition unit 132, and then causes the information display unit 161 to display the candidates (step S03).

The input acquisition unit 163 then acquires an operation selected by the user (step S04). The operation selected by the user may be an operation other than among those candidates presented by the operation candidate presenting unit 133. The history management unit 134 updates the operation history table in accordance with the operation selected by the user (step S05).

Figure 7:
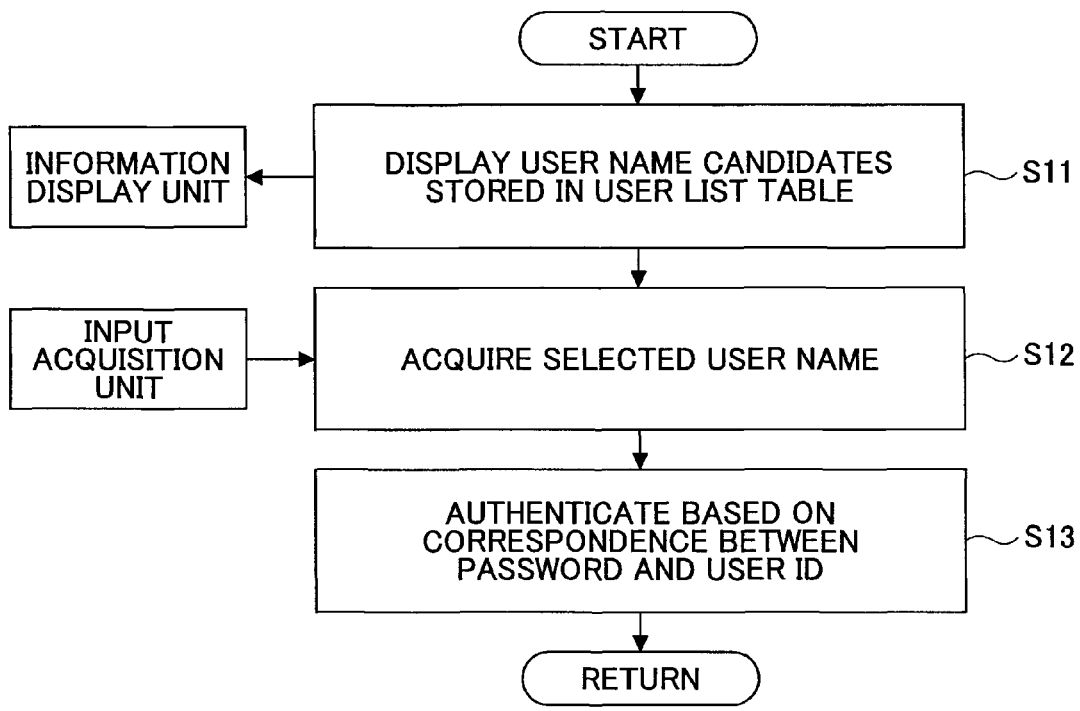
FIG. 7 shows a flowchart of a user authentication process in detail.

FIG. 7 shows a flowchart illustrating the process of user authentication in detail.

Figure 8:
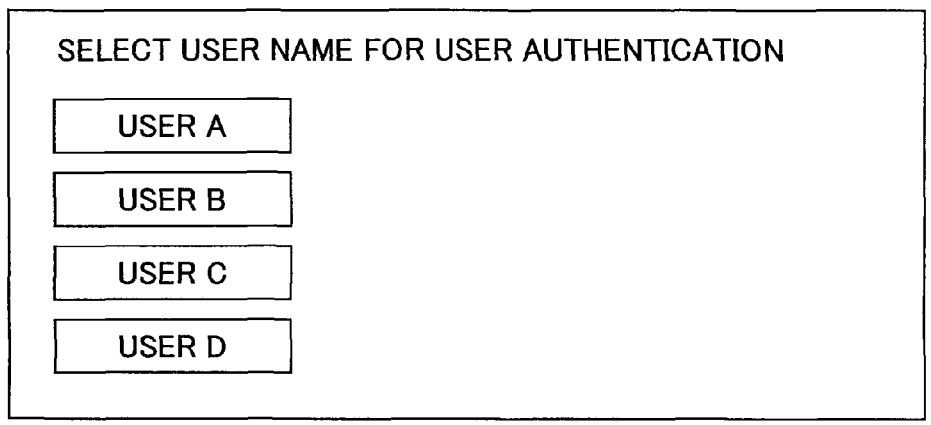
FIG. 8 shows an example of a screen for entering a user name.

First, the information display unit 161 displays a list of user names, as shown in FIG. 8 (step S11). A user selects one of the user names from the displayed list via the operation instructing unit 162; the user name designated by the user is then acquired by the input acquisition unit 163 (step S12).

The user authentication unit 131 then prompts the entry of a password as needed, and authenticates the user based on the password. Specifically, a message prompting the entry of a password is displayed on the information display unit 161. Upon detection by the input acquisition unit 163 of a password entered by the user via the operation instructing unit 162, the user authentication unit 131 authenticates the user by determining whether the acquired user ID corresponds to the password (step S13).

Figure 9:
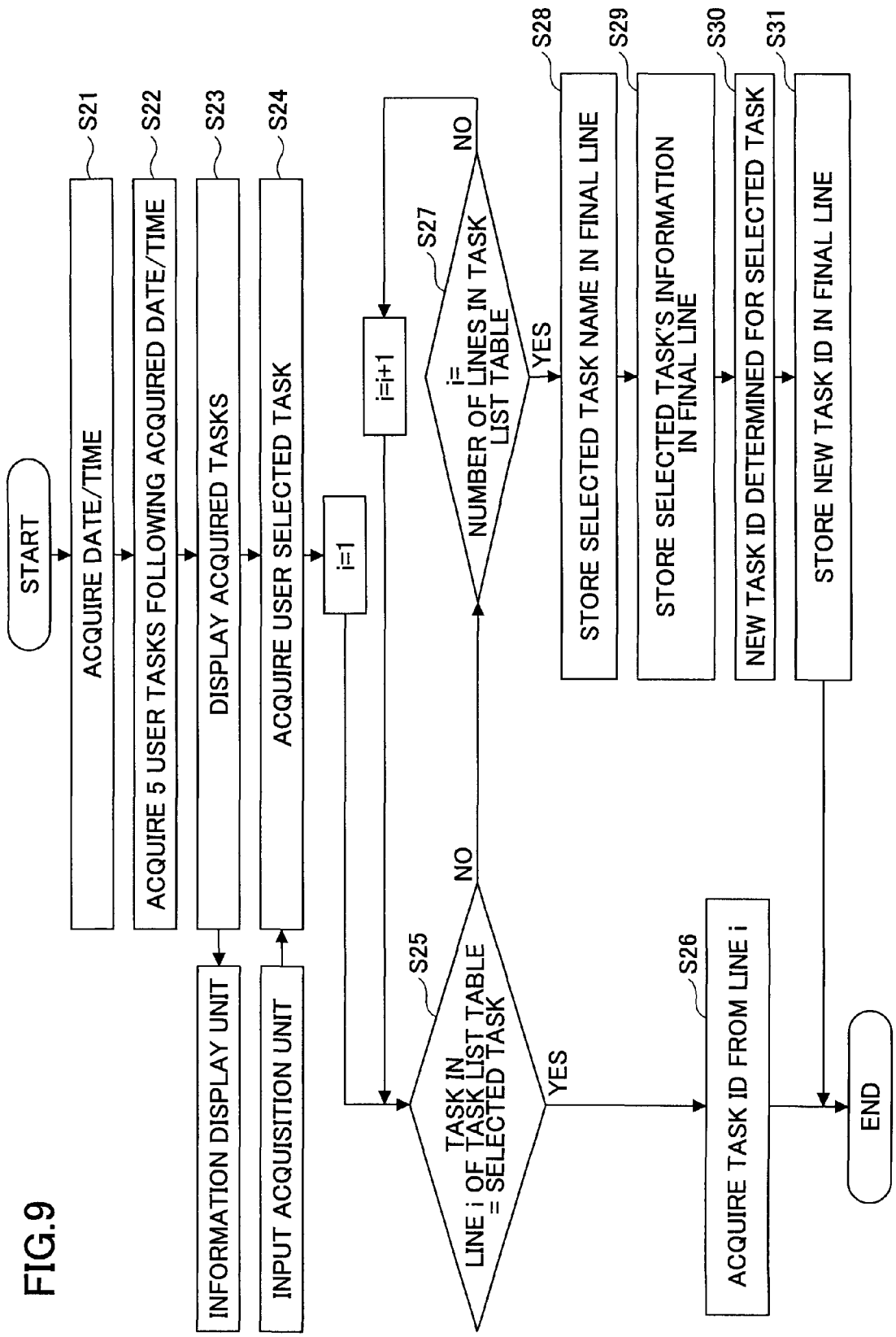
FIG. 9 shows a flowchart of a process of acquiring a task ID in detail.

FIG. 9 shows a flowchart illustrating the process of acquiring a task ID in detail.

First, the task acquisition unit 132 acquires the current date/time by referring to a system clock managed by the operating system, for example (step S21).

The task acquisition unit 132 then accesses a database (such as in the task information management server 200) in which task information is managed, and acquires a predetermined number (such as five) of items of task information subsequent to the acquired current date/time, from the database. The task acquisition unit 132 then saves the acquired task information in the memory 150 (step S22).

The number of task information items that are acquired may be determined by the number of such items that can be displayed on the screen of the multifunction peripheral 100 at once. The database in which task information is managed may be a groupware database having a schedule function, a to-do management function, and a project management function.

Figure 10:
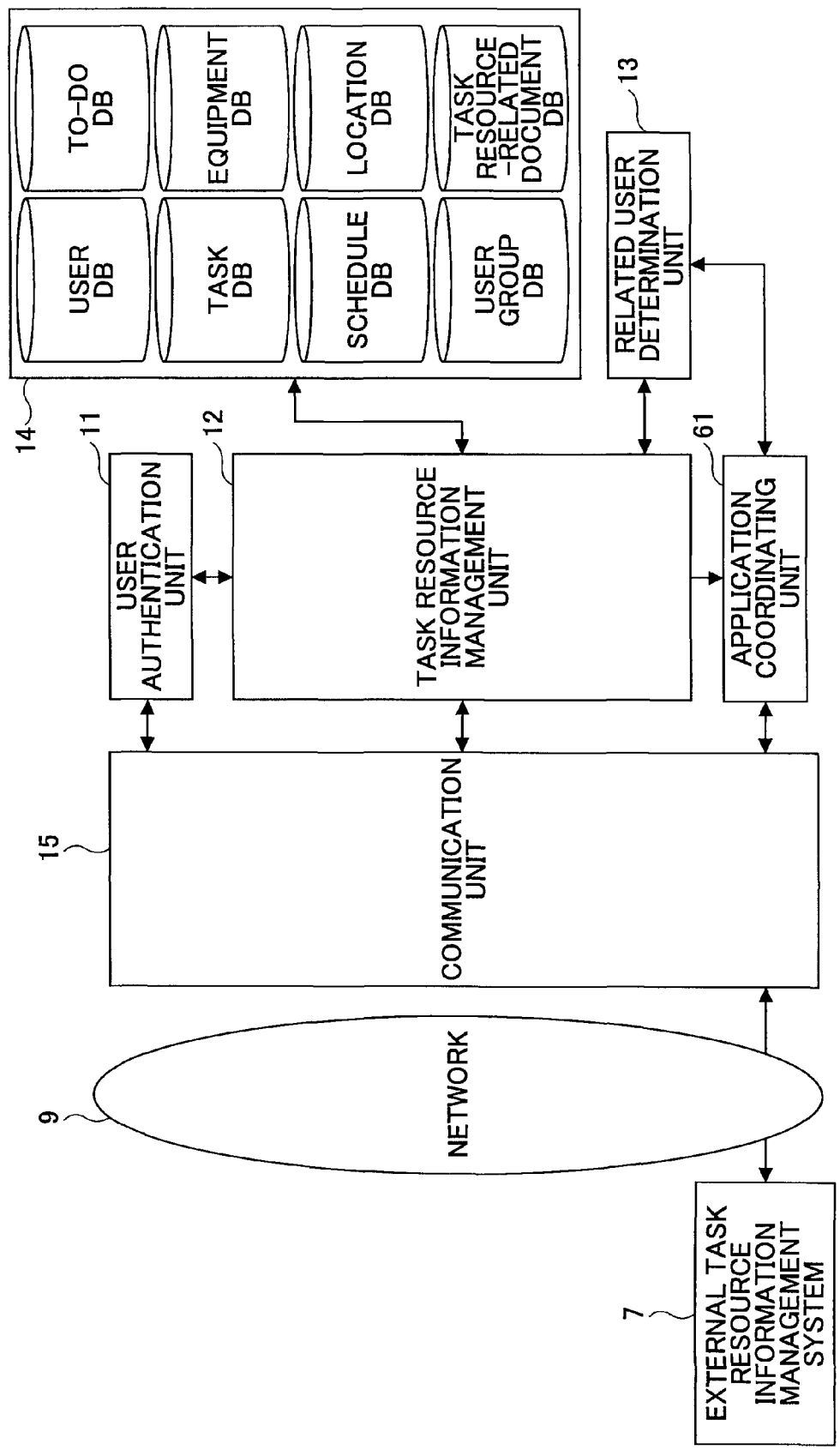
FIG. 10 shows a schematic diagram of a task information management server.

In the following, a method of acquiring task information is described with reference to a case where the database in which task information is managed (such as in the task information management server 200) comprises a database in an information processing apparatus disclosed in Japanese Laid-Open Patent Application No. 2007-048240. FIG. 10 schematically shows a configuration of the task information management server.

The multifunction peripheral 100 corresponds to an external task resource information management system 7 shown in FIG. 10. In order to acquire task information, the external task resource information management system 7 transmits a user ID, date/time information, and, if necessary, the type of task to a communication unit 15 of the task information management server on a network using HTTP. The communication unit 15 of the task information management server acquires the task information determined by the transmitted user ID, date/time information, and the designated type of task, from a database unit 14.

The types of task include "Schedule," "To-do," "Project," and "User group," as shown in FIG. 11. The task information that is acquired consists of those items shown in FIG. 11; namely, the type of each task and items associated with each task.

Specifically, the task information management server determines a range of dates/times of tasks to be acquired, based on the date/time information that it has received. The range of dates/times of the tasks to be acquired that is determined may be one month before and after the date/time indicated by the received date/time information, or one month after the date/time indicated by the received date/time information.

The task information management server then accesses the database unit 14 of the task information management server, and extracts a list of relevant task information based on data concerning the determined range of dates/times of the tasks to be acquired, the received user ID, and the received type of task. The list is then transmitted back by the communication unit 15 in XML format using HTTP, and received by the network interface 170 of the multifunction peripheral 100.

The task acquisition unit 132 causes the acquired task information to be displayed on the information display unit 161, as shown in FIGS. 12, 13, 14, 15, and 16 (step S23). Specifically, a screen adapted to the type of task designated by the user is displayed on the information display unit 161.

For example, when the type of task is "Schedule," a screen shown in FIG. 12 is displayed on the information display unit 161. A predetermined number of items of schedule information subsequent to the acquired date/time are displayed in chronological order. The number of items of the schedule information that is presented may be determined by the size of the screen.

The schedule information includes the date/time of a scheduled event, the name of a scheduled event, people associated with a scheduled event, and a location associated with a scheduled event. The date/time may be either a point in time or a period.

By pressing a button "Previous" or a button "Next" shown in FIG. 12, events scheduled earlier or later than the displayed date/time can be displayed.

When the type of task is "To-do," a screen shown in FIG. 13 is displayed on the information display unit 161, in which a predetermined number of items of to-do information subsequent to the acquired date/time are presented in chronological order. The number of the items of to-do information that is presented may be determined by the size of the screen.

To-do information includes the date/time associated with to-do information; name of to-do information; people associated with to-do information; and a location associated with to-do information. The date/time may indicate either a certain point in time or a period.

By pressing a button "Previous" or a button "Next" shown in FIG. 13, items of to-do information earlier or later than the displayed date/time can be displayed.

When the type of task is "Project," a screen shown in FIG. 14 is displayed on the information display unit 161. A predetermined number of items of project information subsequent to the acquired date/time are displayed in chronological order. The number of items of project information that is displayed may be determined by the size of the screen.

Project information includes the date/time associated with a project; name of a project; people associated with a project; and a location associated with a project. The date/time may be either a point in time or a period.

By pressing a button "Previous" or a button "Next" shown in FIG. 14, projects earlier or later than the displayed date/time can be displayed.

When the type of task is "User group," a screen shown in FIG. 15 is displayed on the information display unit 161. A predetermined number of items of user group information subsequent to the acquired date/time are displayed in chronological order. The number of items of user group may be determined by the size of the screen.

User group information includes the date/time associated with a user group; name of a user group; people included in a user group; and a location associated with a user group. The date/time may be a point in time or a period.

By pressing a button "Previous" or a button "Next" shown in FIG. 15, user groups with associated dates/times before or after the displayed date/time can be displayed.

Task information may be displayed comprehensively on the information display unit 161 regardless of the type, as shown in FIG. 16. In this case, the information displayed may include the type of each task, in addition to the information described above.

Thereafter, the user selects one of the items from a presented list via the operation instructing unit 162. The input acquisition unit 163 then acquires the name of the task corresponding to the selected information and associated task-related information (step S24). The task acquisition unit 132 determines whether there is a combination of the name of the acquired task and task-related information in the task list table (step S25).

If it is determined in step S25 that there is the combination of the name of the task and task information in a designated line i in the task list table, a corresponding task ID is acquired (step S26). If it is determined in step S25 that there is no combination of the name of the task and task information in the designated line i in the task list table, the task acquisition unit 132 determines whether the combination of the task name and task information exists in the other lines in the task list table (step S27). If it is determined in step S27 that the combination of the task name and task information does not exist in any of the lines in the task list table, the task acquisition unit 132 saves the task name and additional information in the final line (steps S28 and S29).

Following step S29, the task acquisition unit 132 acquires a task ID that does not exist in the task list table as a new task ID (step S30) and saves it in the final line of the task list table (step S31). Whether or not the acquired task corresponds to any of the tasks in the task list table may be determined on the basis of correspondence in terms of the combination of a task name and additional information, the combination of associated people and date/time information, or the combination of an associated location and date/time information.

Figure 17:
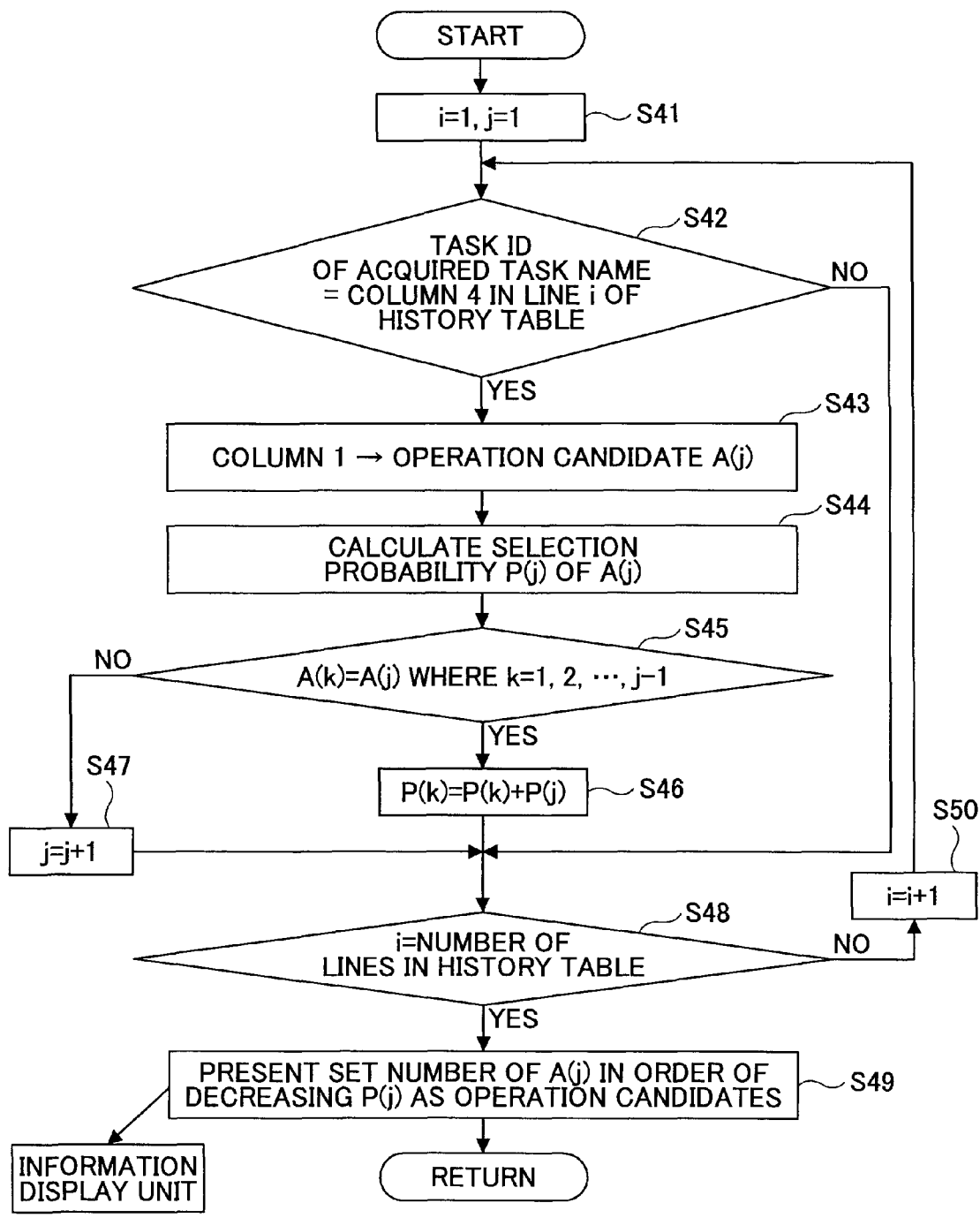
FIG. 17 shows a flowchart of a process of presenting operation candidates in detail.

In the following, the process of presenting operation candidates is described in detail with reference to a flowchart of FIG. 17. In this process, with regard to each of those operations stored in the task ID operation history storage table that are associated with the same task ID as the acquired task ID, the probability of being selected this time is calculated, and operation candidates are listed in order of decreasing probability.

First, the operation candidate presenting unit 133 initializes a variable i with 1 (i=1), i indicating the position of a line in the operation history table shown in FIG. 5. The operation candidate presenting unit 133 also initializes a variable j with 1 (j=1), j indicating the ID of a temporary operation candidate (step S41). The operation candidate presenting unit 133 then compares the task ID acquired by the task acquisition unit 132 with a task ID stored in line i in the fourth column of the operation history table (step S42).

If the comparison in step S42 shows that the task IDs correspond to each other, the operation content stored in line i in the first column of the operation history table is designated an operation candidate A(j) (step S43). The comparison in step S42 may be based on whether the user ID acquired by the user authentication unit 131 corresponds to the user ID stored in line i in the third column of the operation history table, in addition to the correspondence of the task IDs; namely, correspondence in both task IDs and user IDs may be the condition for proceeding to step S43.

Thereafter, the probability P(j) of selection of operation candidate A(j) is calculated (step S44). The calculation of P(j)

may be performed by one of the following two methods. In one method, an arbitrary constant is chosen for P(j). In the other method, a difference between the current date/time and the date/time in line i in the second column of the operation history table is obtained and exp(−date/time difference) is calculated as P(j).

As described above, since there is the possibility that there are operations having the same operation content and the same task ID in the operation history table, the selection probability of a particular operation content is the sum of the selection probability of each of the operations having the same operation content and the same task ID. Therefore, the operation candidate presenting unit 133, in the process of which a flowchart is shown in FIG. 17, determines whether there are operations having the same operation content and the same task ID by determining whether the temporary operation candidate A(j) is the same as any of the finalized operation contents A(k), where k=1, 2, . . . , j−1 (step S45). If there exists the same operation having the same task ID, the operation candidate presenting unit 133, in order to update the selection probability P(k) of the operation having the same task ID, performs a calculation P(k)=P(k)+P(j) (step S46). Needless to say, the k in step S46 is the same k that satisfies operation candidate A(j)=operation candidate A(k) in step S45. If there does not exist the same operation having the same task ID, the operation candidate presenting unit 133 regards the temporary operation candidate A(j) as a new finalized operation content, and calculates j=j+1 in order to determine the selection probability of the next operation candidate (step S47).

When the operation history table has been referenced to the last line; i.e., when i=the number of lines in the operation history table (step S48), the operation candidate presenting unit 133 displays a predetermined number of operation candidates on the information display unit 161 as shown in FIG. 18, in order of decreasing selection probability (step S49). Namely, a predetermined number of selection probabilities P(1) to P(j) are identified in order of decreasing probability, and operation candidates A corresponding to the identified selection probabilities P are displayed on the information display unit 161. When the operation candidate presenting unit 133 has not yet referenced the final line in the operation history table, i is incremented by one in order to reference the next line (step S50). The predetermined number is the number of operation candidates that are presented. While in the present embodiment the predetermined number is described as being determined in advance, it may be selected by the user.

Figure 19:
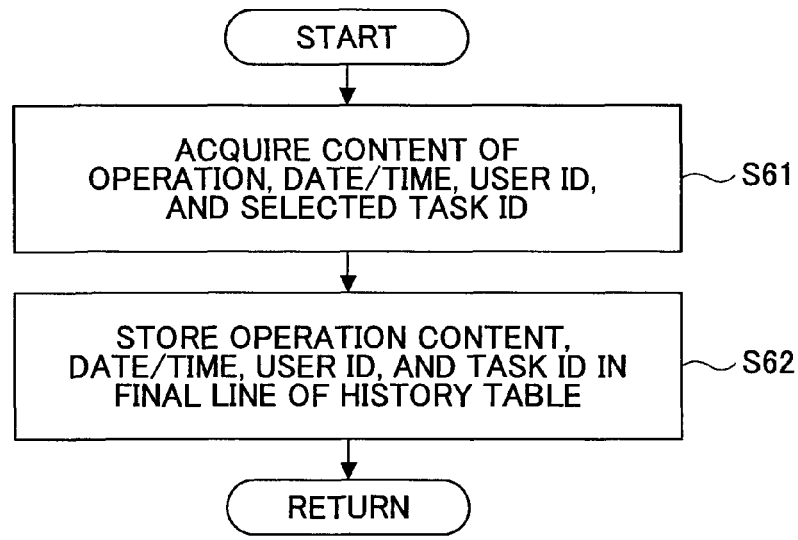
FIG. 19 shows a flowchart of a process of editing an operation history table in detail.
Figure 20:
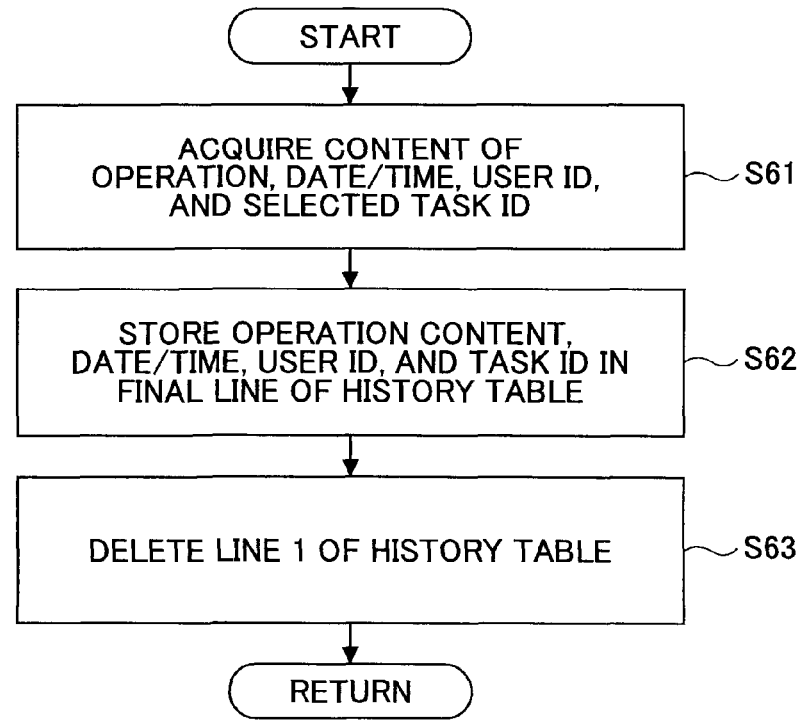
FIG. 20 shows a flowchart of a process of editing an operation history table in detail.

In the following, a process of editing the operation history table is described in detail with reference to flowcharts shown in FIGS. 19 and 20. The process performed by the history management unit 134 includes two kinds; i.e., history addition and history update. In a case where an operation content does not exist in any of the lines in the operation history table and there is room for more lines that can be set, a history addition process is applied; in a case where all of the lines in the operation history table are filled, a history update process is applied.

Initially, the history addition flow is described with reference to FIG. 19. An operation content that a user has actually performed, date/time information as of the time of operation, user ID, and a selected task ID are acquired (step S61). The acquired operation content, date/time information, user ID, and selected task ID are stored in the first, second, third, and fourth columns, respectively, in the final line of the operation history table (step S62).

The history update process is described with reference to FIG. 20. An operation content that a user has actually performed, date/time information as of the time of operation, user ID, and a selected task ID are acquired (step S61). The acquired operation content, date/time information, user ID, and selected task ID are stored in the first, second, third, and fourth columns, respectively, in the final line of the operation history table (step S62). Further, the initial line of the operation history table is deleted (step S63).

In the following, another embodiment of the present invention is described.

The present invention may be applied to apparatuses other than the above-described multifunction peripheral. For example, the present invention may be implemented by a personal computer in which a program for carrying out the present invention is installed. In this case, a history of operations performed on the personal computer, such as printing, transmission, and editing operations, is managed in association with tasks. By referring to the operation history, it becomes possible to present operation candidates on the computer that are associated with a task. Alternatively, by selecting an image already associated with a task, it becomes possible to present candidates for operations on that image based on the associated task.

Figure 21:
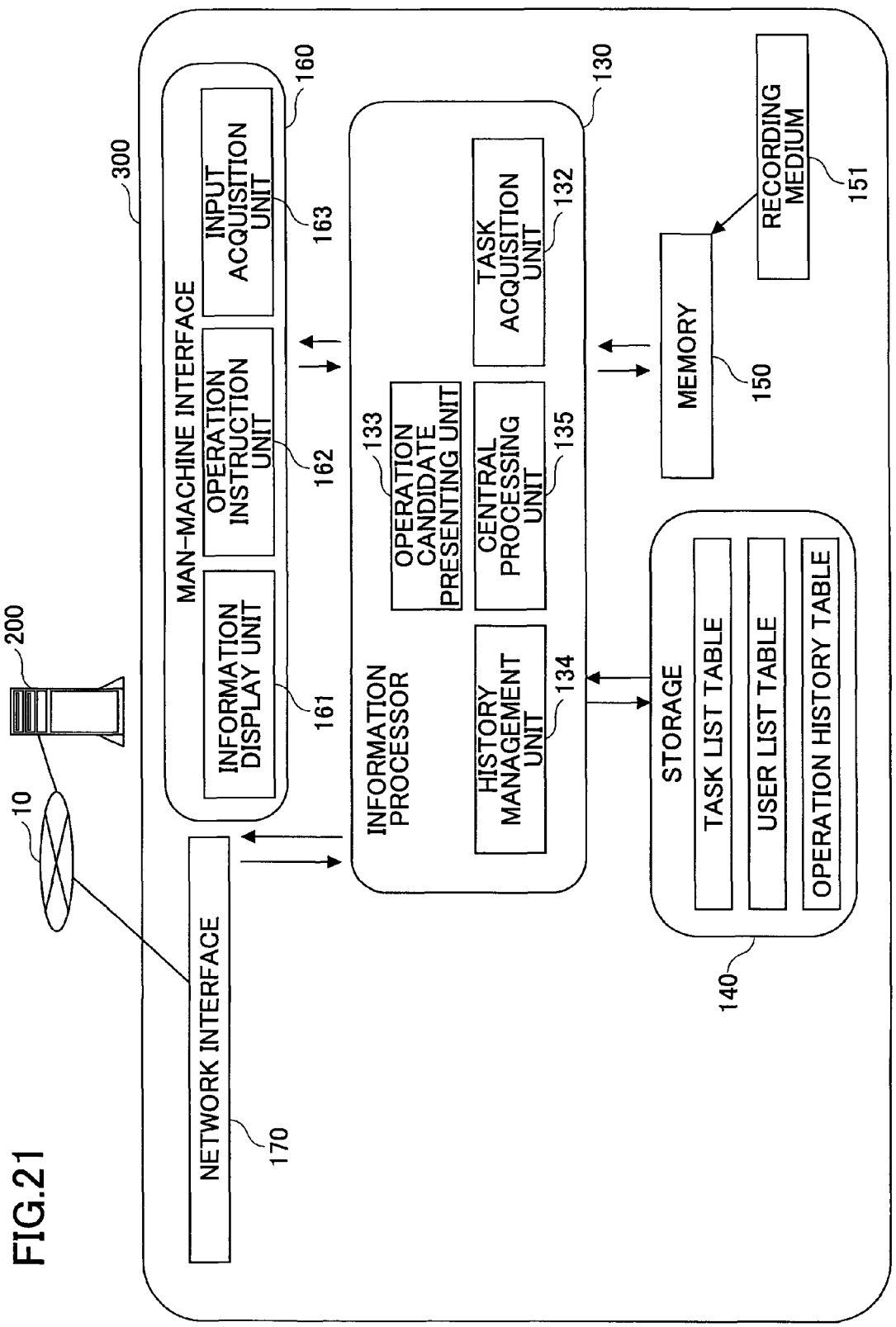
FIG. 21 shows a system configuration of a personal computer.

FIG. 21 shows a system configuration of the above-mentioned personal computer. In the following, only the differences from the multifunction peripheral shown in FIG. 2 are described, and similar units or components are designated with similar numerals without further describing them.

In a personal computer 300 shown in FIG. 21, user authentication is performed by the operating system upon log-in to the personal computer 300. In the present system, since a user ID that is obtained upon authentication is used, the user authentication unit 131 may not be included in the present system. It is assumed that the personal computer does not basically comprise the printer device 110 nor the scanner device 120.

Figure 22:
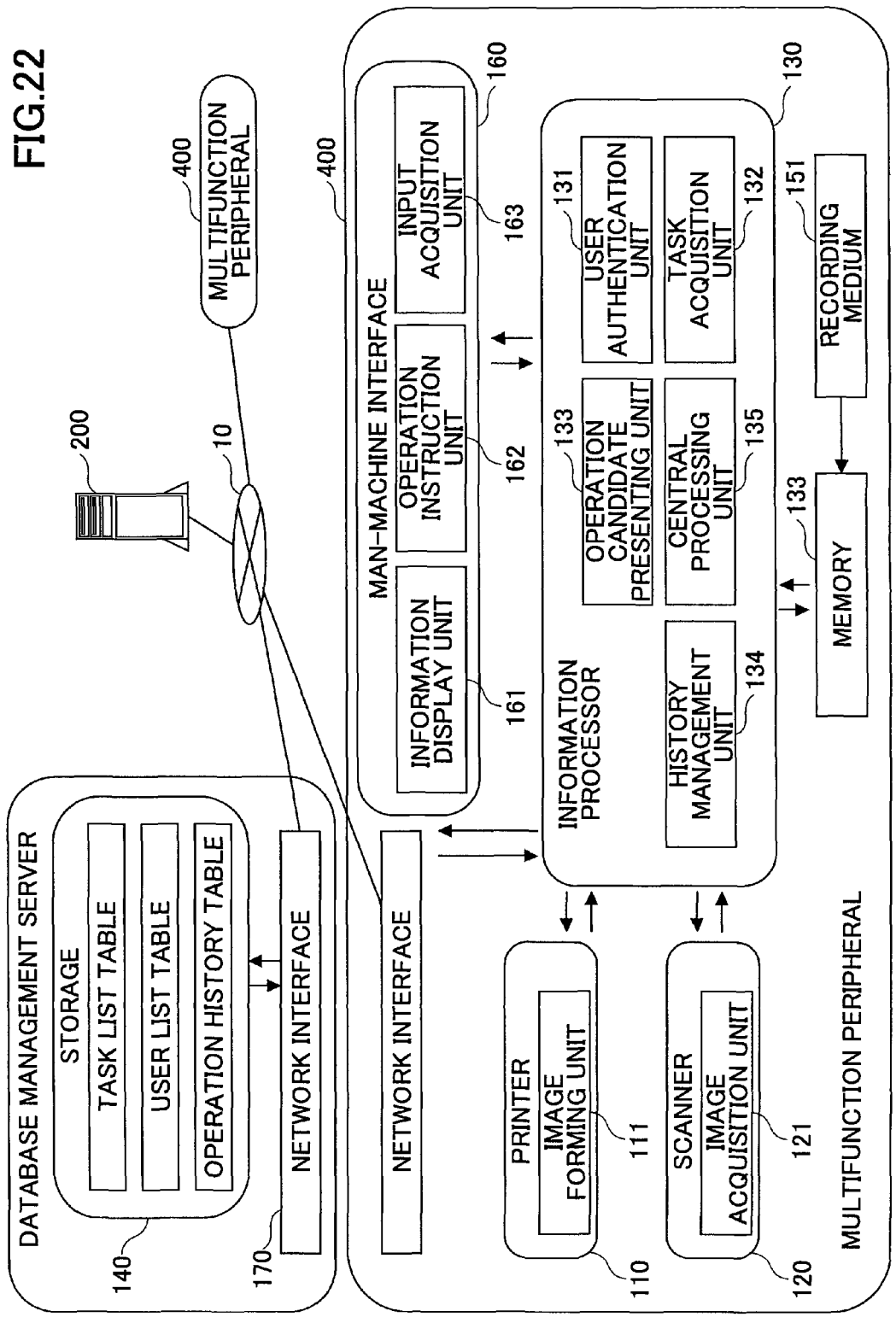
FIG. 22 shows a system configuration of a multifunction peripheral in a case where a database is managed by an external database management server.

FIG. 22 shows a system configuration of a multifunction peripheral 400 in a case where a database is managed by an external server (database management server). In the following, only the differences from the multifunction peripheral shown in FIG. 2 are described, and similar units or components are designated with similar numerals without further describing them.

Information about tasks owned by users, operation history information, and information about the association between each item of task information and each operation are stored in a storage unit 140, which is maintained on a database management server on the network 10. Each storage table is referenced or updated via the network interface 170. In the system of FIG. 22, plural multifunction peripherals 400 having similar systems may be connected to the network 10.

In the system of FIG. 22, since the operation history information and task information are retained in the external database management server, the operation history information and task information saved by any of the multifunction peripherals 400 can be called up by any other multifunction peripheral 400 connected to the network 10. Thus, any one of the multifunction peripherals 400 can perform the same operation.

Thus, in accordance with the information processing system of the present embodiment, when an operation has been performed on an image file or the like, operation history is saved together with task information associated with the operation. Accordingly, when an operation is performed later, an operation associated with the same task information can be readily recalled. As a result, the user can search for an operation easily, and operation candidates can be presented based on the operation history in such a manner as to better reflect the user's intension.

While the present invention has been described with reference to specific embodiments, it will be appreciated by those skilled in the art that variations and changes can be made without departing from the scope of the invention.

The present application is based on the Japanese Priority Application No. 2007-068857 filed Mar. 16, 2007, the entire contents of which are hereby incorporated by reference.

What is claimed is:

1. An information processing apparatus to which a storage unit that stores (a) a task list table including one or more items of task information, each particular item of task information indicating a particular task related to a user's work, a scheduled date-and-time of the particular task and a task ID associated with the particular task to be performed by the user, and (b) an operation history table associating the task information with an operation is connected, the information processing apparatus comprising:
   a user authentication unit that identifies a user who carries out an operation;
   a task acquisition unit that acquires the task information concerning the user identified by the user authentication unit, from the task list table;
   an operation candidate presenting unit that presents an operation candidate, including the task ID, based on the task information acquired by the task acquisition unit and by referring to the operation history table,
   the operation candidate presenting unit including a selection probability calculating unit that calculates for each specific operation candidate of a plurality of operation candidates, a probability of selection of the specific operation candidate by the user; and
   a history management unit that updates the operation history table in accordance with an operation designated by the user,
   wherein the task acquisition unit acquires a current date-and-time, and for each specific task indicated in the task list table, compares the scheduled date-and-time of the specific task to the acquired current time before the task acquisition unit acquires the task information from the task list table, and if the scheduled date-and-time of the specific task is after the acquired current time, the task acquisition unit acquires the task information, including the task ID, of the specific task, and
   wherein the specific task indicated in the task information acquired from the task list table includes at least one of to-do information indicating user tasks the user planned to perform, a project to which the user has been assigned, or a user group of which the user is a member,
   wherein the operation candidate presenting unit presents the plurality of operation candidates in a decreasing order of probability of selection of the operation candidates.

2. The information processing apparatus according to claim 1, wherein
   the operation history table associates the task information with date/time information indicating when the operation was carried out, and
   the operation candidate presenting unit presents the operation candidates in chronological order from the current date/time based on the date/time information in the operation history table.

3. The information processing apparatus according to claim 1, wherein
   the operation history table associates the task information with information about the user who performed the operation, and
   the operation candidate presenting unit presents the operation candidates based on correspondence between the user information in the operation history table and the user identified by the user authentication unit.

4. The information processing apparatus according to claim 1, wherein
   the operation history table associates the task information with information about the user who performed the operation, and
   the operation candidate presenting unit presents the operation candidates regardless of whether or not the user information in the operation history table corresponds to the user identified by the user authentication unit.

5. The information processing apparatus according to claim 1, wherein the task information identifies at least one of a meeting, a business trip and another scheduled work activity of the user.

6. An information processing method that utilizes information stored in a storage unit that stores (a) a task list table including one or more items of task information, each particular item of task information indicating a particular task related to a user's work, a scheduled date-and-time of the particular task and a task ID associated with the particular task to be performed by the user, and (b) an operation history table associating the task information with an operation, the information processing method comprising the steps of:
   (i) authenticating a user who performs an operation;
   (ii) acquiring the task information concerning the authenticated user, from the task list table;
   (iii) presenting an operation candidate based on the acquired task information, including the task ID, and by referring to the operation history table;
   (iv) calculating for each specific operation candidate of a plurality of operation candidates, a probability of selection of the specific operation candidate by the user;
   (v) presenting the plurality of operation candidates in a decreasing order of probability of selection of the operation candidates; and
   (i) updating the operation history table in accordance with an operation designated by the user,
   wherein the information processing method further comprises:
   (j) acquiring a current date-and-time, and for each specific task indicated in the task list table and concerning the user, comparing the scheduled date-and-time of the specific task to the acquired current time before the task information of the specific task is acquired in (ii), wherein if the scheduled date-and-time of the specific task is after the acquired current time, the task information, including the task ID, of the specific task is acquired in (ii), and
   wherein the specific task indicated in the task information acquired from the task list table includes at least one of to-do information indicating user tasks the user planned to perform, a project to which the user has been assigned, or a user group of which the user is a member.

7. The information processing method according to claim 6, wherein
   the operation history table associates the task information with date/time information indicating when the operation was carried out, and the method further includes presenting operation candidates in chronological order from the current date/time based on the date/time information in the operation history table.

8. The information processing method according to claim 6, wherein
the operation history table associates the task information with information about the user who performed the operation, and
the method further includes presenting operation candidates based on correspondence between the user information in the operation history table and the user authenticated in the user authentication step.

9. The information processing method according to claim 6, wherein
the operation history table associates the task information with information about the user who performed the operation, and
the method further includes presenting operation candidates regardless of whether or not the user information in the operation history table corresponds to the user authenticated in the user authentication step.

10. A non-transitory computer-readable recording medium storing a program for causing a computer to carry out an information processing method that utilizes information stored in a storage unit that stores (a) a task list table including one or more items of task information each particular item of task information indicating a particular task related to a user's work, a scheduled date-and-time of the particular task and a task ID associated with the particular task to be performed by the user, and (b) an operation history table associating the task information with an operation, the information processing method comprising the steps of:
(i) authenticating a user who performs an operation;
(ii) acquiring the task information concerning the authenticated user, from the task list table;
(iii) presenting an operation candidate based on the acquired task information, including the task ID, and by referring to the operation history table;
(iv) calculating for each specific operation candidate of a plurality of operation candidates, a probability of selection of the specific operation candidate by the user;
(v) presenting the plurality of operation candidates in a decreasing order of probability of selection of the operation candidates; and
(i) updating the operation history table in accordance with an operation designated by the user,
wherein the information processing method further comprises:
(j) acquiring a current date-and-time, and for each specific task indicated in the task list table and concerning the user, comparing the scheduled date-and-time of the specific task to the acquired current time before the task information of the specific task is acquired in (ii) wherein if the scheduled date-and-time of the specific task is after the acquired current time, the task information, including the task ID, of the specific task is acquired in (ii), and
wherein the specific task indicated in the task information acquired from the task list table includes at least one of to-do information indicating user tasks the user planned to perform, a project to which the user has been assigned, or a user group of which the user is a member.

11. The computer-readable recording medium according to claim 10, wherein
the operation history table associates the task information with date/time information indicating when the operation was carried out, and
the method further includes presenting operation candidates in chronological order from the current date/time based on the date/time information in the operation history table.

12. The computer-readable recording medium according to claim 10, wherein the operation history table associates the task information with information about the user who performed the operation, and
the method further includes presenting operation candidates based on correspondence between the user information in the operation history table and the user identified by the user authentication unit.

13. The computer-readable recording medium according to claim 10, wherein the operation history table associates the task information with information about the user who performed the operation, and
the method further includes presenting operation candidates regardless of whether or not the user information in the operation history table corresponds to the user identified by the user authentication unit.

* * * * *